(12) United States Patent
Thyagaturu et al.

(10) Patent No.: US 12,255,921 B2
(45) Date of Patent: Mar. 18, 2025

(54) EFFICIENT ENCRYPTION IN VPN SESSIONS

(71) Applicant: Intel Corporation, Santa Clara, CA (US)

(72) Inventors: Akhilesh S. Thyagaturu, Tempe, AZ (US); Vinodh Gopal, Westborough, MA (US)

(73) Assignee: Intel Corporation, Santa Clara, CA (US)

( * ) Notice: Subject to any disclaimer, the term of this patent is extended or adjusted under 35 U.S.C. 154(b) by 764 days.

(21) Appl. No.: 17/349,247

(22) Filed: Jun. 16, 2021

(65) Prior Publication Data
US 2021/0314359 A1 Oct. 7, 2021

(51) Int. Cl.
*H04L 9/40* (2022.01)
(52) U.S. Cl.
CPC .......... *H04L 63/18* (2013.01); *H04L 63/0272* (2013.01); *H04L 63/029* (2013.01); *H04L 63/0428* (2013.01); *H04L 63/164* (2013.01); *H04L 63/166* (2013.01); *H04L 63/168* (2013.01)

(58) Field of Classification Search
CPC ... H04L 63/18; H04L 63/0272; H04L 63/029; H04L 63/0428; H04L 63/164; H04L 63/166; H04L 63/168; H04L 63/0478
See application file for complete search history.

(56) References Cited

U.S. PATENT DOCUMENTS

| | | | |
|---|---|---|---|
| 9,571,457 B1 * | 2/2017 | Hoy | H04L 63/0272 |
| 2007/0218912 A1 * | 9/2007 | Song | H04L 63/166 |
| | | | 455/445 |

(Continued)

FOREIGN PATENT DOCUMENTS

CN 103188351 A * 7/2013

OTHER PUBLICATIONS

"Fortigate SSL VPN", Fortigate Guide, downloaded from https://tekguru4u.com/fortigate-ssl-vpn/, Jun. 14, 2021, 5 pages.
(Continued)

*Primary Examiner* — Joseph P Hirl
*Assistant Examiner* — Aayush Aryal
(74) *Attorney, Agent, or Firm* — Compass IP Law PC (57) ABSTRACT

Methods, apparatus, and software for efficient encryption in virtual private network (VPN) sessions. A VPN link and an auxiliary link (and associated sessions) are established between computing platforms to support end-to-end communication between respective application running on the platforms. The VPN link may employ a conventional VPN protocol such as TLS or IPsec, while the auxiliary link comprises a NULL encryption VPN tunnel. To transfer data, a determination is made to whether the data are encrypted or non-encrypted. Encrypted data are transferred over the auxiliary link to avoid re-encryption of the data. Non-encrypted are transferred over the VPN link. TLS and IPsec VPN agents may be used to assist in setting up the VPN and auxiliary sessions. The techniques avoid double encryption of VPN traffic, while ensuring that various types of traffic transferred between platforms is encrypted.

9 Claims, 8 Drawing Sheets

(56) References Cited

U.S. PATENT DOCUMENTS

2016/0315920 A1* 10/2016 Kurmala ............. H04L 63/0471
2020/0162382 A1*  5/2020 Mendoza ............... H04L 45/74

OTHER PUBLICATIONS

Lacković et al, "Performance Analysis of Virtualized VPN Endpoints," 2017 40th International Convention on Information and Communication Technology, Electronics and Microelectronics (MIPRO), May 2017, 6 pages.
Shantharama et al, "Hardware Acceleration for Container Migration on Resource-Constrained Platforms", IEEE Access, received Aug. 6, 2020, accepted Sep. 11, 2020, date of publication Sep. 18, 2020, date of current version Oct. 6, 2020, 16 pages.
Shantharama, "Hardware-Accelerated Platforms and Infrastructures for Network Functions: A Survey of Enabling Technologies and Research Studies", in IEEE Access, vol. 8, 2020, 65 pages.
Talkington et al., "Detecting Devices and Protocols on VPN-Encrypted Networks", 2020 Sixth International Conference on Mobile And Secure Services (MobiSecServ), Feb. 2020, 8 pages.

* cited by examiner

Application → Network Driver:

Socket_Open{
Source_IP: A
Target IP: B
Source Port: C
Target Port: C
Session_information:{
...
400 — Is_encrypted;
Authentication_needed;
Setup_duration,
Network_layer_encryption_needed;
...}
}

*Fig. 4a*

Table of TLS ID and SSL Records with Ciphers and NULL Encryption Ciphers — 420

| TLS Session ID | SSL Record {Fragmentation, Integrity Authentication, Encryption} | Property: {Cipher, port, duration, etc.} |
|---|---|---|
| TLS Session ID — 422 | SSL Record | Property: {Cipher, port, duration, etc.} |
| ●● | ●● | ●● |
| TLS Session ID | SSL Record — 424 | Property: {Cipher, port, duration, etc.} — 426 |

*Fig. 4b*

Table of Security Association of IPsec with Ciphers and NULL Encryption Ciphers — 430

| Security Association ID | Security Parameter Index (SPI) 1 | Property: {Cipher, duration, etc.} |
|---|---|---|
| Security Association ID — 432 | Security Parameter Index (SPI) 2 | Property: {Cipher, duration, etc.} |
| ●● | ●● | ●● |
| Security Association ID | Security Parameter Index (SPI) N — 434 | Property: {Cipher, duration, etc.} — 436 |

*Fig. 4c*

VPN management software module maintains these tables

EFFICIENT ENCRYPTION IN VPN SESSIONS

BACKGROUND INFORMATION

A virtual private network (VPN) extends functionality, security and related aspects of a private network across a public network and enables users to send and receive data across shared or public networks as if their computing devices were directly connected to the private network. Generally, a VPN will use an encrypted tunneling protocol to tunnel traffic from end-to-end (e.g., between two end users, or between a user and a Website). The encryption is implemented at the network layer (Layer 4 in the OSI model).

For its early history, the Internet employed the Hypertext Transfer Protocol (HTTP) to handle most traffic, such as between clients and Web servers (while are also known in the art as HTTP servers). HTTP is an application layer (Layer 7 in the OSI model) protocol that uses plain text. Due to security concerns and other benefits, much if not most of today's Web traffic employs Hypertext Transfer Protocol Secure (HTTPS), which is an extension of HTTP that is used for secure communication over computer networks, such as the Internet. In HTTPS, the communication protocol is encrypted using Transport Layer Security (TLS) or, formerly, Secure Sockets Layer (SSL). The protocol is therefore also referred to as HTTP over TLS, or HTTP over SSL.

Current VPN strategies are agnostic to application data type. For example, the VPN interface re-encrypts the data at the network layer, even when the data is already encrypted at the application layer. In a recent paper published in 2020 (Talkington et al., "Detecting Devices and Protocols on VPN-Encrypted Networks" In 2020 Sixth International Conference on Mobile And Secure Services (MobiSecServ), pp. 1-8. IEEE, 2020), the authors state: "This means that the standard HTTPS encrypted traffic is encapsulated in an additional layer of encryption. The VPN will not allow one to filter out the irrelevant traffic, as it is all contained in the tunnel. With such a double-encrypted data set that contains irrelevant traffic, a VPN scenario requires extra consideration when applying analysis."

Figure 1:
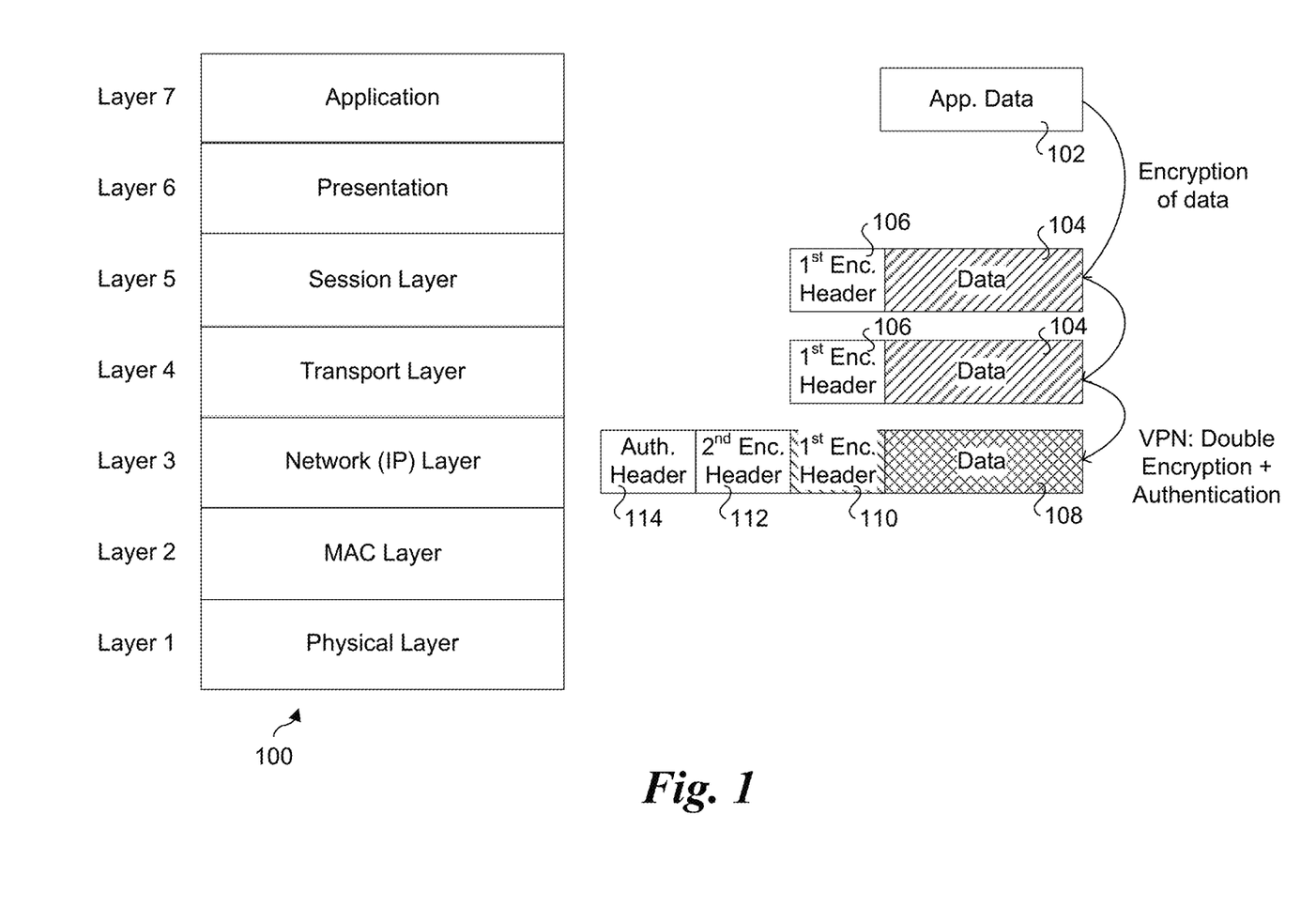
FIG. 1 is a diagram illustrating double encryption of HTTPS traffic using conventional VPN links.

FIG. 1 illustrates an example of double encryption. As shown, the OSI model 100 includes 7 layers. Application data 102 is generated by an application at the Application Layer. The application data is unencrypted (also referred to as "plain text"). While HTTP resides at Layer 7, HTTPS is implemented at Layers 5 and 6. Accordingly, HTTPS encrypts application data 102 using a first level of encryption to generate encrypted data 104. A first encryption header 106 in plain text is also added. VPN encryption is then applied at the Network Layer. This encrypts first encryption header 106 and re-encrypts encrypted data 104 to generate double-encrypted data 108 and encrypted first encryption header 110. A second encryption header 112 and an authentication header 114 is also added.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DETAILED DESCRIPTION

Embodiments of methods and apparatus for efficient encryption in VPN sessions are described herein. In the following description, numerous specific details are set forth (such as to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

In accordance with aspects of the embodiments disclosed herein, several techniques are provided for enhancing VPN management schemes such that double encryption is avoided. The techniques include use of a TLS mechanism to establish an auxiliary link with NULL encryption security comprising a NULL encryption VPN tunnel during the setup phase such that packets are not re-encrypted at the IP layer. An IPsec mechanism is also disclosed to establish an auxiliary Security Association (SA) for NULL security during the VPN setup phase.

According to further aspects, an application notifies the socket whether the data is already encrypted or not. Application Programming Interface (API) modifications related to open_socket APIs on the network interface are provided to enable applications to include data-encryption information while initiating the network flow (IP connections). The Application can choose to follow a traditional approach, and request IP layer re-encryption. A mechanism is also provided at the VPN interface to judiciously select the NULL encryption path, or encryption path based on the flow information provided by the applications.

The solution enables applications, VMs, and Containers to be able transmit their data through VPN sessions without being double encrypted. In one embodiment, this is done by enabling a NULL encryption in link auxiliary to VPN security sessions, and diverting the already encrypted data into NULL encrypted sessions.

Figure 2:
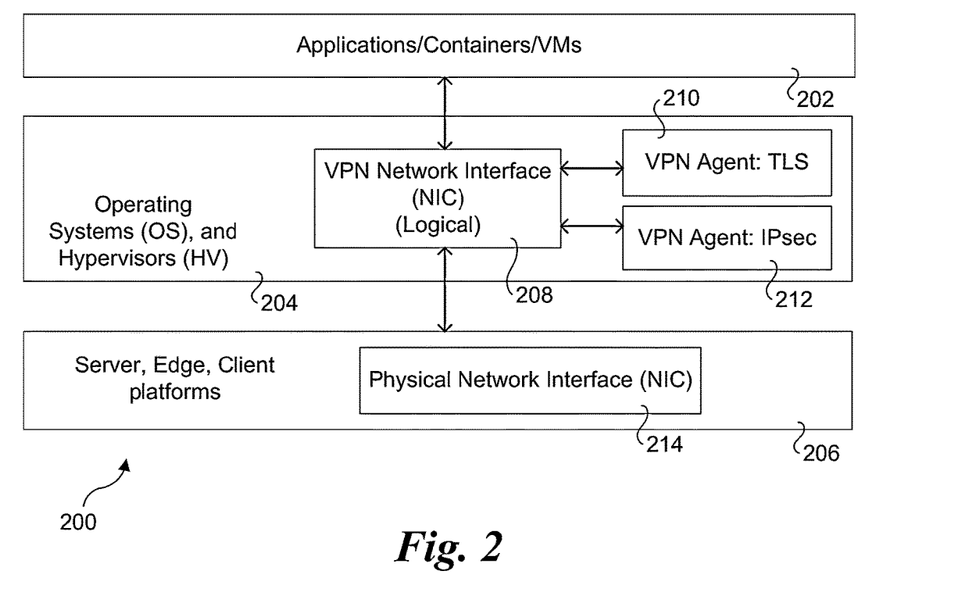
FIG. 2 is a high-level architecture diagram illustrating aspects of an efficient VPN solution that avoids double-encryption, according to one embodiment.

FIG. 2 shows a high-level architecture 200 of an embodiment of the solution. Architecture 200 includes a user software layer 202 in which applications, containers and virtual machines (VMs) are run. Software layer 204 includes operating systems (OS) and hypervisors. The bottom layer is a hardware layer 206 comprising server, edge, and client platforms. Software layer 204 includes a VPN network interface (or network interface controller (NIC) 208, which is a logical NIC interface. Software layer 204 also includes a TLS VPN agent 210 and an IPsec VPN agent 212. The physical NIC 214 is implemented in hardware layer 206.

TLS VPN agent 210 is used to implement aspects of SSL/TLS VPNs. SSL/TLS VPNs are widely used in browser-based applications, but are otherwise limited (require custom development to support other types of applications).

Internet Protocol Security (IPsec) is a secure network protocol suite that authenticates and encrypts packets of data to provide secure encrypted communication between two computers over an Internet Protocol (IP) network and is used in VPNs. IPsec VPNs protect IP packets exchanged between remote networks or hosts and an IPsec gateway located at the edge of a private network. IPsec VPNs can generally support any IP-based application. IPsec VPN agent 212 is used to implement aspects of IPsec, including both conventional aspects and new aspects, as discussed below.

Figure 3:
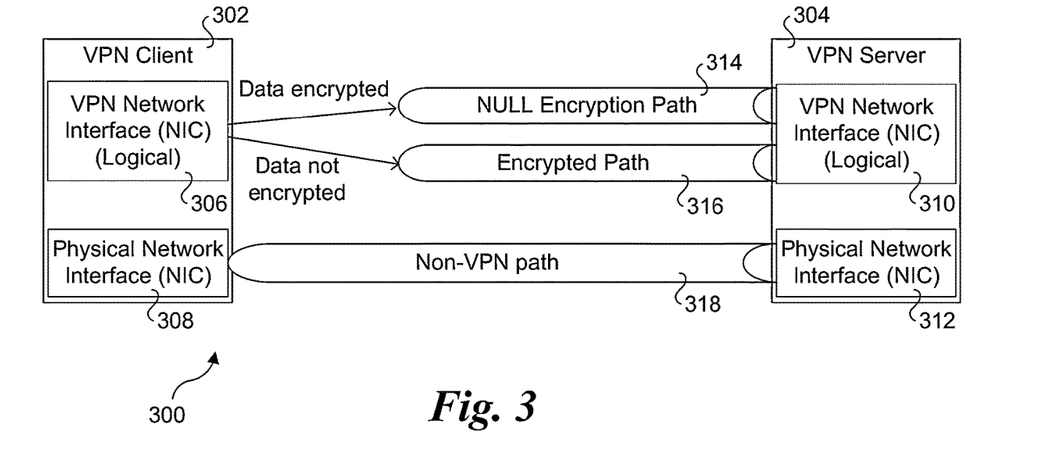
FIG. 3 is a diagram illustrating a high-level overview of the efficient VPN solution when applied to communication between a VPN client and a VPN server.

FIG. 3 shows a diagram 300 illustrating a high-level overview of the solution when applied to communication between a VPN client 302 and a VPN server 304. The VPN client 302 includes a VPN network interface 306 (similar to VPN network interface 206) and a physical NIC 308. Similarly, VPN client 304 includes a VPN network interface 310 and a physical NIC 312.

Diagram 300 shows two VPN paths, including a NULL encryption path 314 and an Encrypted path 316. The NULL encryption path is used for data that is encrypted at a layer above the transport layer (e.g., via HTTPS). For non-encrypted data, encrypted path 316 is taken. Non-VPN path 318 represented the physical forwarding path between physical NICs 312 and 308. As will be recognized by those skilled in the art, while diagram 300 illustrated paths from VPN server 304 to VPN client 302, similar paths would be used for traffic originating from VPN client 302 that is destined for VPN server 304.

Figure 4A:
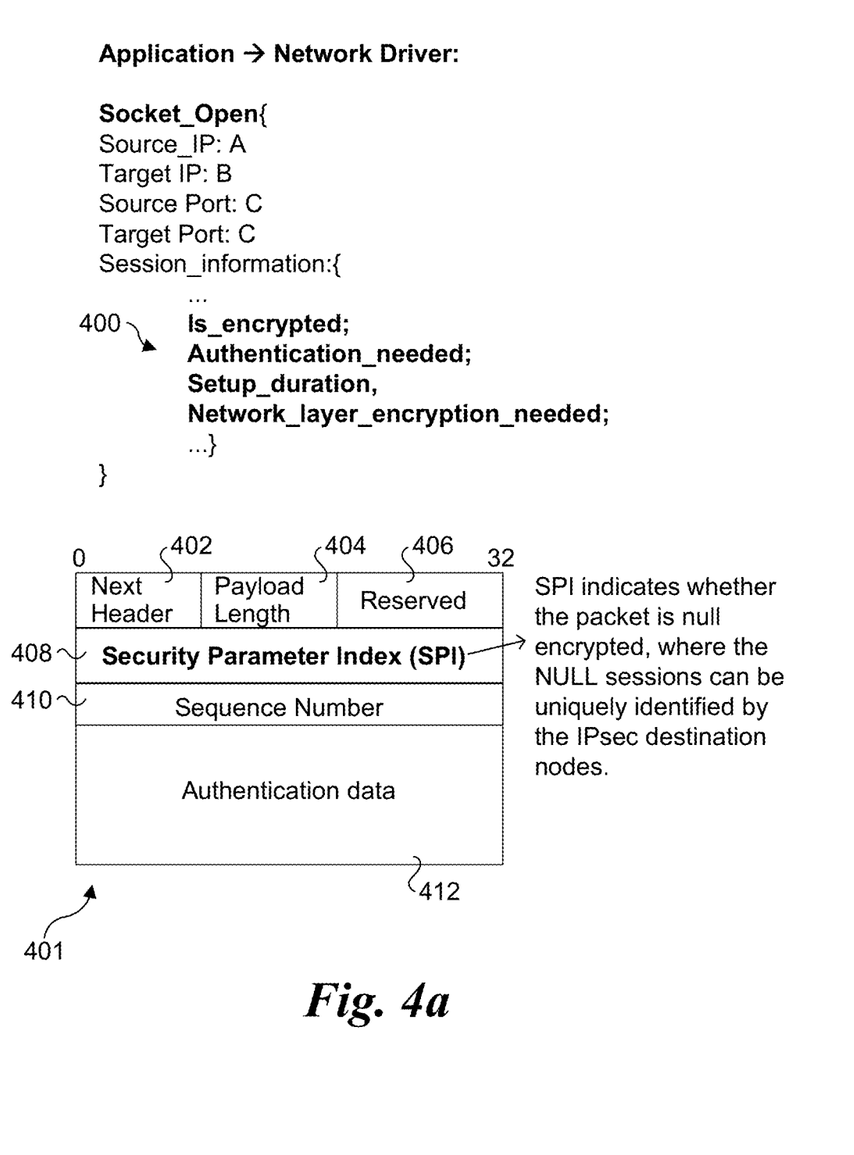
FIG. 4a is a diagram illustrating a Socket_Open object and a VPN packet header including a Security Parameter Index.
Figure 4B:
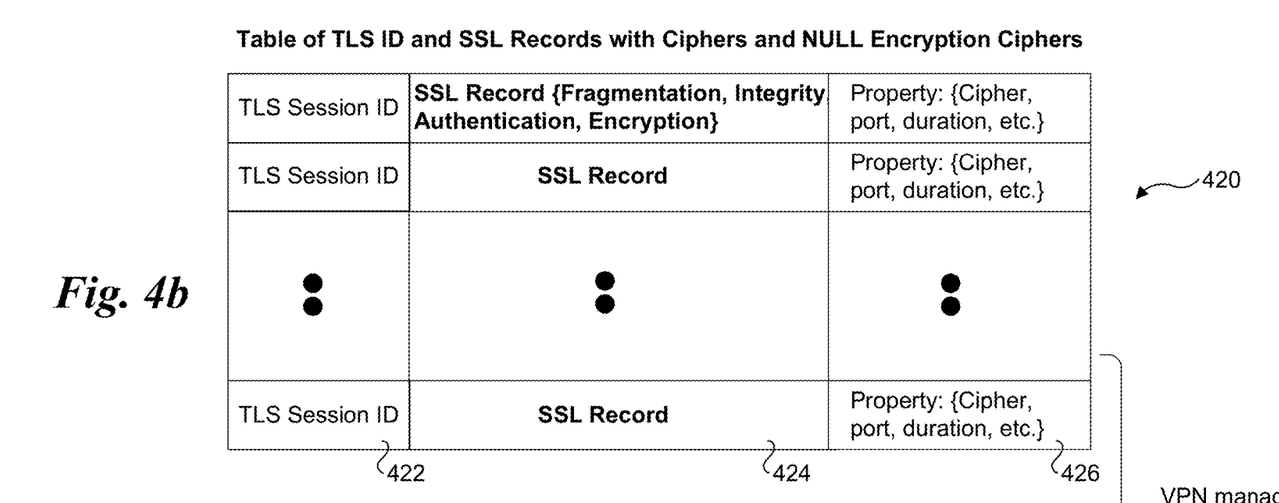
FIG. 4b is a table of TLS ID and SSL records with ciphers and null encryption ciphers.
Figure 4C:
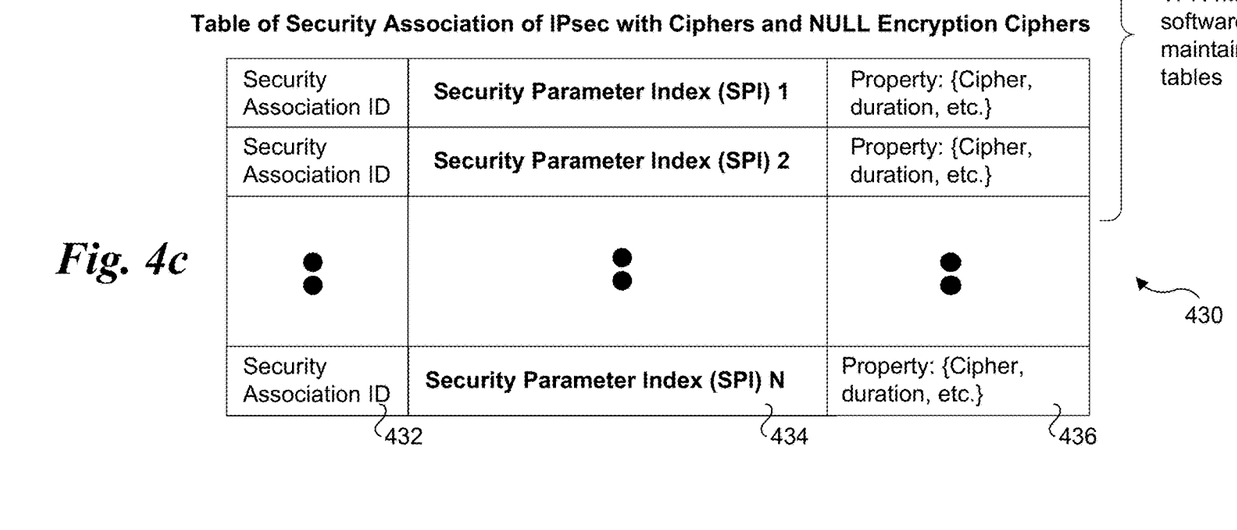
FIG. 4c is a table of security association of IPsec with ciphers and null encryption ciphers.

FIGS. 4a, 4b, and 4c show proposed VPN management framework changes and database requirements. The changes are relative to an existing VPN management framework and are shown in bold.

As shown in FIG. 4a, the change to the application network driver Socket_Open( ) object is the parameters 400 added to the Session_information parameters. FIG. 4a further shows a data structure 401 including a next header 402, a payload length 404, a reserved field 406, a new Security Parameter Index (SPI) field 408, a sequence number 410, and authentication data 412. The SPI indicates whether the packet is null encrypted, where the NULL sessions can be uniquely identified by the IPsec destination nodes.

FIG. 4b shows a table 420 of TLS ID and SSL records with ciphers and null encryption ciphers (e.g., plain text is used). The three columns in table 420 includes a TLS session ID column 422, and SSL record column 424, and a property column 426. TLS session ID column 422 contains TLS session IDs. SSL record column 424, which is new, contains SSL records including fragmentation, integrity authentication, and encryption data). Property column 426 contains a list of properties, such as cipher port, duration, etc.

FIG. 4c shows a table 430 of security association of IPsec with ciphers and null encryption ciphers. The columns for table 430 include a security association ID column 432 containing security association IDs, a new security parameters index column 434 containing SPI indexes, and a property column 436 containing a list of properties.

The proposed framework employs the following changes to the operations of VPN session establishments.

1. Application will save the context of data security, e.g., whether it is being secured through application-level security such as HTTPS.
2. Application will call the socket_open( ) function of the network driver with encryption information.
3. Network driver will use the additional TLS sessions, in case of TLS based VPN, where the new session, e.g., with different port IDs, is setup with NULL encryption ciphers to avoid double encryption.
4. In case of IPsec, use of SPI index and security association in IPsec to enable NULL encryption ciphers to avoid double encryption. To keep track of all the established sessions in the IPsec, there exists a database, namely, Security Association Database (SADB). The SPI uniquely identifies each entry in the database as a 32-bit identifier, in one embodiment. Therefore, we can associate the SPI index to keep track of NULL encrypt links. To which, whenever needed SPI can be referenced to use the NULL encrypt links.
5. Database of TLS sessions that are capable of NULL encryption ciphers, and valid ciphers, which can be used to steer the traffic to respective sessions as needed.
6. Database of IPsec sessions that consists of Security Associations involving NULL and valid ciphers.

Figure 5:
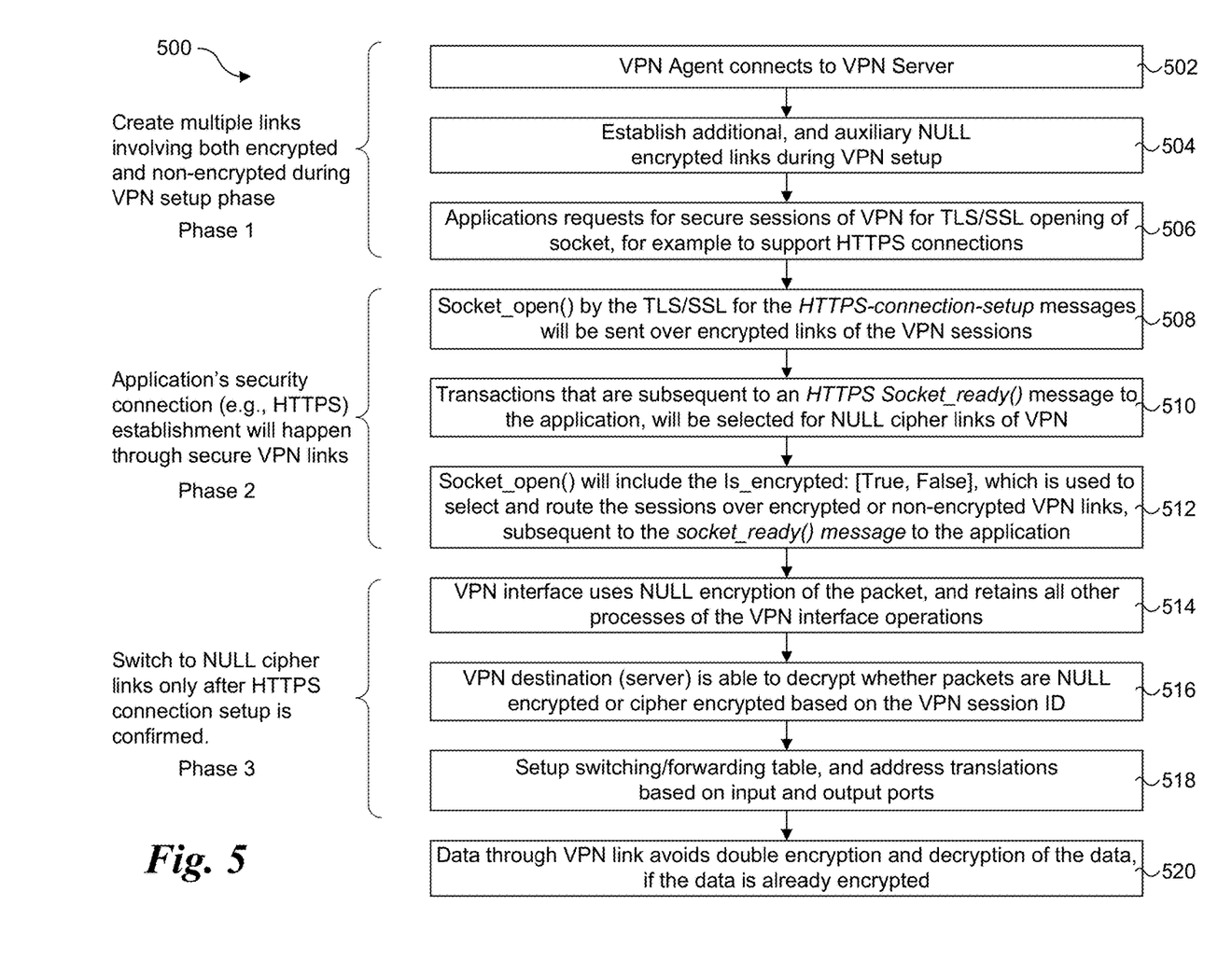
FIG. 5 is a flowchart illustrating end-to-end operations and software interactions to create an auxiliary link to forward data without encryption, according to one embodiment.

FIG. 5 shows a flowchart 500 illustrating end-to-end operations and software interactions to create an auxiliary link comprising a NULL encryption VPN tunnel to forward data without encryption, according to one embodiment. As shown, the operations are divided into three phases. During Phase 1, multiple links involving both encrypted and non-encrypted traffic are set up during a VPN setup phase. During Phase 2, the application's security connection, such as using HTTPS, is established through use of secure VPN links. During Phase 3, a switch to NULL encryption links is performed after HTTPS connection setup is confirmed.

In further detail the following operations are performed. Phase 1 begins in a block 502 in which the VPN agent connects to a VPN server. In a block 504, additional and auxiliary NULL encrypted links are established during VPN setup. In a block 506, applications requests for secure sessions of VPN for TLS/SSL opening of socket or received. For example, an application may request to support an HTTPS connection.

Next, we proceed to Phase 2. In a block 508, Socket_open( ) by the TLS/SSL for the HTTPS-connection-setup messages will be sent over encrypted links of the VPN sessions. In a block 510, transactions that are subsequent to an HTTPS Socket_ready( ) message to the application, will be selected for NULL encryption links of the VPN. As shown in a block 512, Socket_open( ) will include the Is_encrypted: [True, False] parameter, which is used to select and route the sessions over encrypted or non-encrypted VPN links, subsequent to the socket_ready( ) message to the application.

Phase 3 begins with a block 514 in which the VPN interface uses NULL encryption of the packet, and retains all other processes of the VPN interface operations. In a block 516, the VPN destination (e.g., VPN server) is able to decrypt whether packets are NULL encrypted or cipher encrypted based on the VPN session ID. In a block 518, the switching/forwarding table is setup, along with address translations based on the input and output ports on the endpoint devices.

As shown in a block 520, once the VPN link is set up, encrypted data forwarded through the VPN link avoids double encryption and decryption of the data. This enhances VPN link performance without compromising security, since all traffic transferred over the VPN will still be encrypted.

Figure 6:
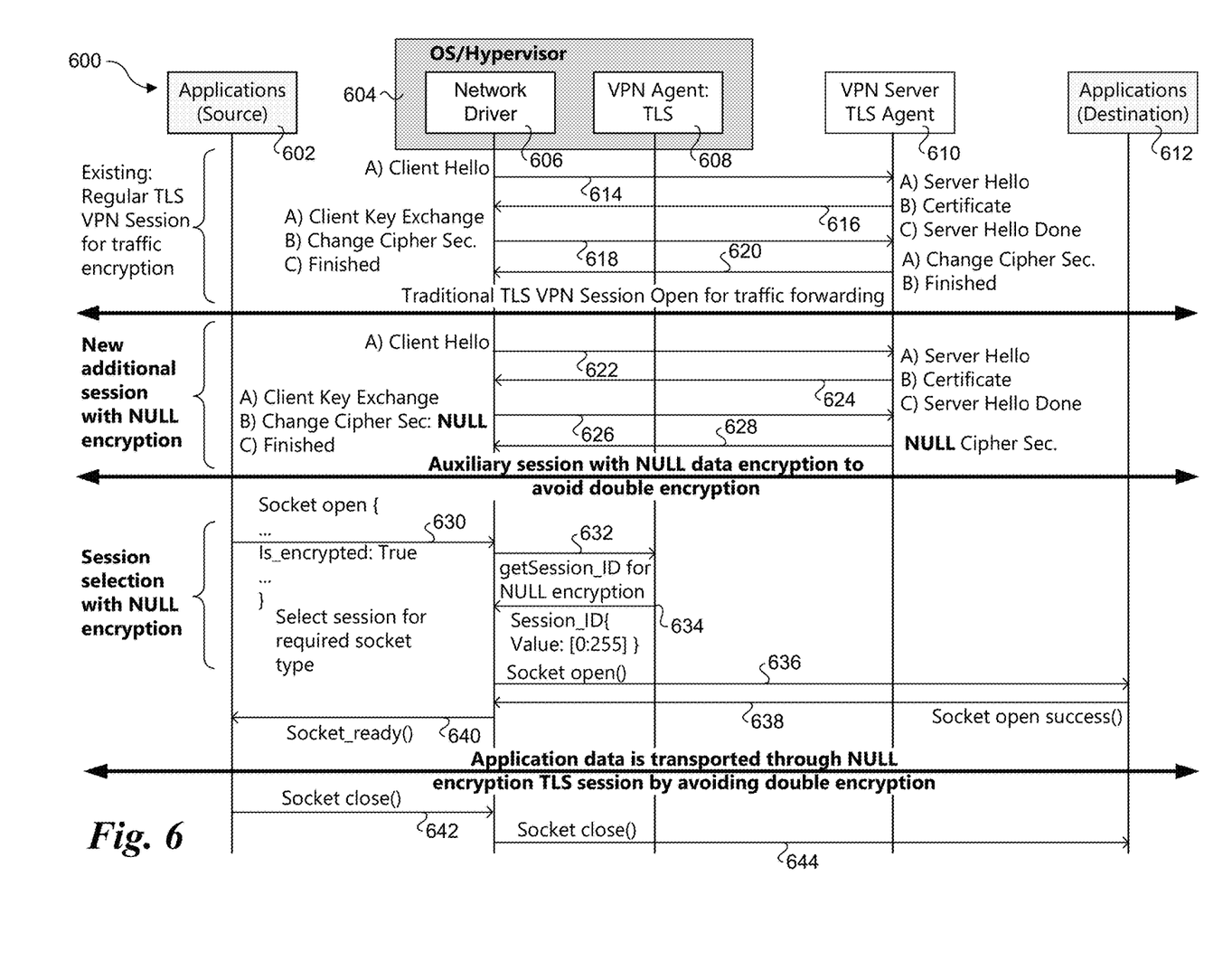
FIG. 6 is message flow diagram for establishing a TLS based VPN session with a NULL encryption auxiliary link, according to one embodiment.

FIG. 6 shows a message flow diagram 600 for establishing a TLS based VPN session, with a NULL encryption auxiliary session, according to one embodiment. The messages are transferred between source applications 602, a network driver 606 and a TLS VPN agent 608 of an OS/hypervisor 604, a VPN server TLS agent 610, and destination applications 612. In the client-server context, source applications and OS/hypervisor 604 are running on the VPN client, while VPN server TLS agent 610, and destination applications 612 are running on the VPN server. In message flow diagram 600 the messages that are bolded are new messages, while the messages shown in regular (non-bolded) text are messages used to set up conventional TLS based VPN sessions.

The first set of message exchanges correspond messages that are exchanged to open a traditional TLS VPN session for traffic forwarding. The messages are exchanged between network driver 606 and VPN server TLS agent 610, and begin with a client Hello message 614 sent to VPN server TLS agent 610. In response, a message 616 is returned to network driver 606 including a server Hello, a certificate, and an indication the server Hello is done. A client server key exchange is then performed using messages 618 and 620 under which the cipher sec is changed at both ends.

The next set of messages are used to establish a new auxiliary session with NULL data encryption to avoid double encryption. Messages 622 and 624 are similar to messages 614 and 616 and are used for a client-server Hello message exchange. In the client-server key exchange messages 626 and 628, message 626 request a change to the cipher sec to NULL, and message 628 confirms the change.

The third set of message exchanges is used to open a socket that may be used to transport application data through the NULL encryption TLS session. In a message 630 sent from a source application 602 to network driver 606 the socket is opened using the Socket_Open object (e.g., shown in FIG. 4a with Is_encrypted set to True. The session is selected for the required socket type. A message 632 containing a getSession_ID for NULL encryption is sent from network driver 606 to TLS VPN agent 608, which returns a message 634 containing a Session_ID with a value. The network driver 606 then sends a Socket open( ) message 636 to a destination application 612, which returns a Socket open success( ) message 638 confirming the socket has been successfully opened. A Socket_ready( ) message 640 is then sent from network driver 606 to source application 602 informing the source application that the socket is ready to use. At this point, data can be exchanged between the source and destination applications using an end-to-end NULL encryption TLS VPN session.

After the data exchange has been completed, the socket is closed in the conventional manner. This includes a Socket close( ) message 642 sent from the source application to network driver 606, which is forwarded as a Socket close( ) message 644 to the destination application.

Figure 7:
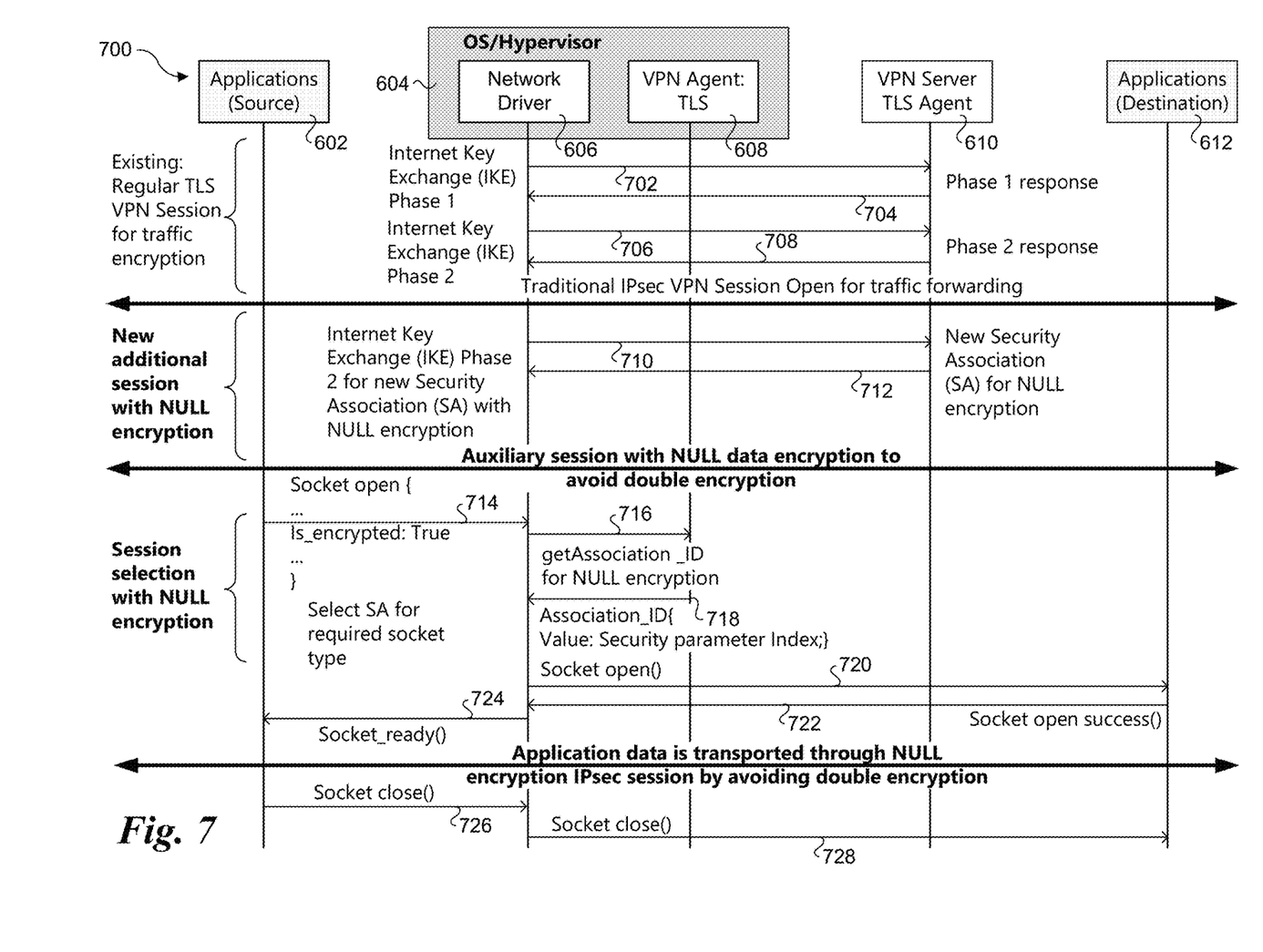
FIG. 7 is a message flow diagram 700 for establishing an IPsec based VPN session with a NULL encryption auxiliary link, according to one embodiment.

FIG. 7 shows a message flow diagram 700 for establishing an IPsec based VPN session with a NULL encryption auxiliary session, according to one embodiment. As before, messages are transferred between source applications 602, network driver 606, TLS VPN agent 608, VPN server TLS agent 610, and destination applications 612. In message flow diagram 700 the messages that are bolded are new messages, while the messages shown in regular (non-bolded) text are messages used to set up conventional TLS based VPN sessions.

The first set of message exchanges correspond to messages that are used to open a traditional IPsec VPN session for traffic forwarding. Phase 1 comprises a first Internet Key Exchange (IKE) between network driver 606 and TLS VPN agent 608 using messages 702 and 704. This is followed by a second IKE exchange using messages 706 and 708 as part of Phase 2.

The next set of messages are used to establish a new auxiliary session with NULL data encryption to avoid double encryption. This is set up similar to the traditional approach, except during Phase 2 the IKE employs the new Security Association with NULL encryption using messages 710 and 712.

The third set of message exchanges is used to open a socket that may be used to transport application data through the NULL encryption IPsec VPN session. In a message 714 sent from a source application 602 to network driver 606 the socket is opened using the Socket_Open object (e.g., shown in FIG. 4a) with Is_encrypted set to True. As before, the session is selected for the required socket type. A message 716 containing a getSession_ID for NULL encryption is sent from network driver 606 to TLS VPN agent 608, which returns a message 718 containing a Session_ID with an SPI value. The network driver 606 then sends a Socket_open( ) message 720 to a destination application 612, which returns a Socket open success( ) message 722 confirming the socket has been successfully opened. A Socket_ready( ) message 724 is then sent from network driver 606 to source application 602 informing the source application that the socket is ready to use. At this point, data can be exchanged between the source and destination applications using an end-to-end NULL encryption IPsec VPN session.

After the data exchange has been completed, the socket is closed in the conventional manner. This includes a Socket close( ) message 726 sent from the source application to network driver 606, which is forwarded as a Socket close( ) message 728 to the destination application.

Example Computing Platform

Figure 8:
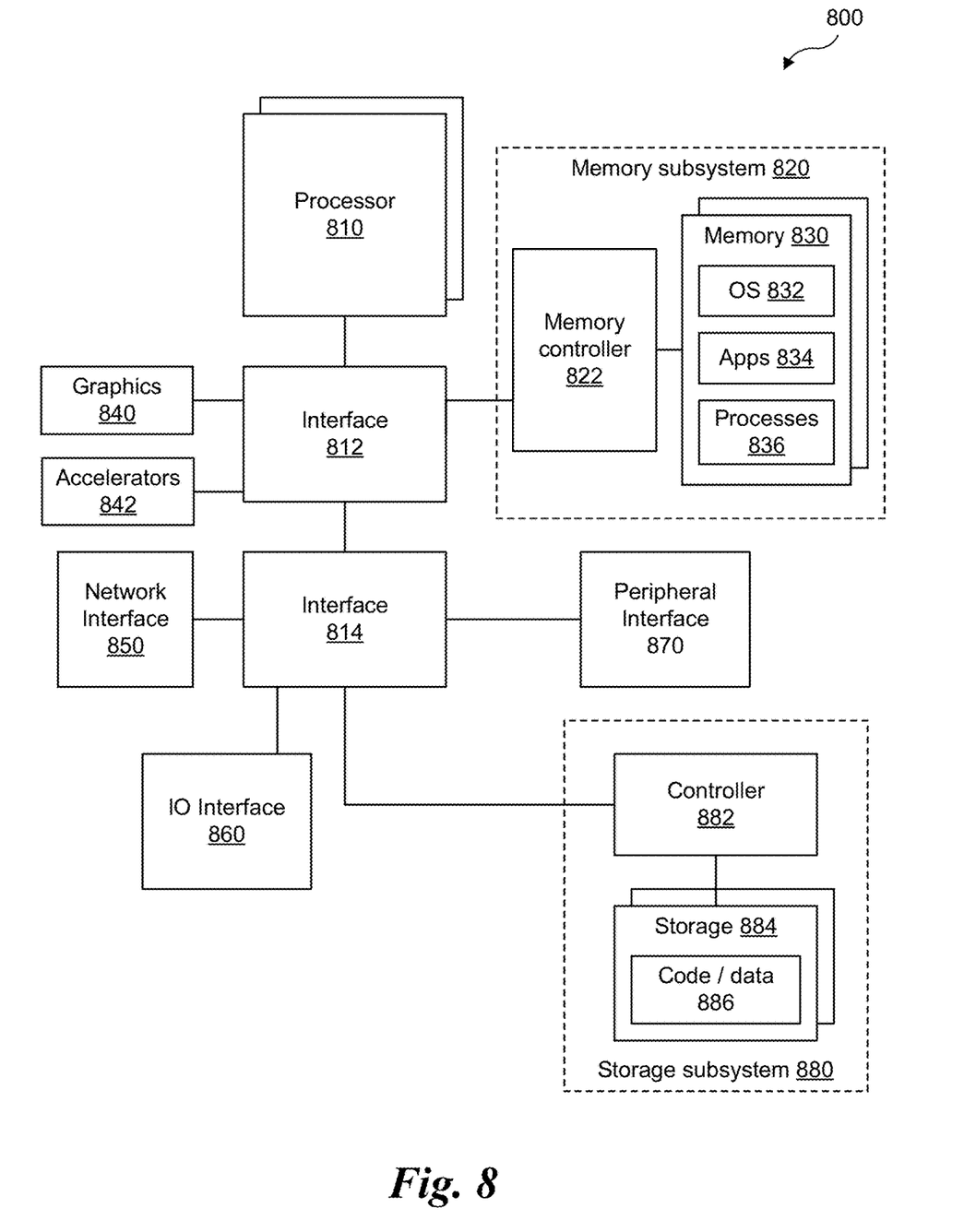
FIG. 8 is a diagram of a computing platform that may be implemented with aspects of the embodiments described and illustrated herein.

FIG. 8 depicts a computing platform 800 such as a server or similar computing system in which aspects of the embodiments disclosed above may be implemented. Computing platform 800 includes one or more processors 810, which provides processing, operation management, and execution of instructions for computing platform 800. Processor 810 can include any type of microprocessor, central processing unit (CPU), graphics processing unit (GPU), processing core, multi-core processor or other processing hardware to provide processing for computing platform 800, or a combination of processors. Processor 810 controls the overall operation of computing platform 800, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, computing platform 800 includes interface 812 coupled to processor 810, which can represent a higher speed interface or a high throughput interface for system components that needs higher bandwidth connections, such as memory subsystem 820 or optional graphics interface components 840, or optional accelerators 842. Interface 812 represents an interface circuit, which can be a standalone component or integrated onto a processor die. Where present, graphics interface 840 interfaces to graphics components for providing a visual display to a user of computing platform 800. In one example, graphics interface 840 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 840 generates a display based on data stored in memory 830 or based on operations executed by processor 810 or both. In one example, graphics interface 840 generates a display based on data stored in memory 830 or based on operations executed by processor 810 or both.

In some embodiments, accelerators 842 can be a fixed function offload engine that can be accessed or used by a processor 810. For example, an accelerator among accelerators 842 can provide data compression capability, cryptography services such as public key encryption (PKE), cipher, hash/authentication capabilities, decryption, or other capabilities or services. In some embodiments, in addition or alternatively, an accelerator among accelerators 842 provides field select controller capabilities as described herein. In some cases, accelerators 842 can be integrated into a CPU socket (e.g., a connector to a motherboard or circuit board that includes a CPU and provides an electrical interface with the CPU). For example, accelerators 842 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs). Accelerators 842 can provide multiple neural networks, CPUs, processor cores, general purpose graphics processing units, or graphics processing units can be made available for use by AI or ML models. For example, the AI model can use or include any or a combination of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 820 represents the main memory of computing platform 800 and provides storage for code to be executed by processor 810, or data values to be used in executing a routine. Memory subsystem 820 can include one or more memory devices 830 such as read-only memory (ROM), flash memory, one or more varieties of random access memory (RAM) such as DRAM, or other memory devices, or a combination of such devices. Memory 830 stores and hosts, among other things, operating system (OS) 832 to provide a software platform for execution of instructions in computing platform 800. Additionally, applications 834 can execute on the software platform of OS 832 from memory 830. Applications 834 represent programs that have their own operational logic to perform execution of one or more functions. Processes 836 represent agents or routines that provide auxiliary functions to OS 832 or one or more applications 834 or a combination. OS 832, applications 834, and processes 836 provide software logic to provide functions for computing platform 800. In one example, memory subsystem 820 includes memory controller 822, which is a memory controller to generate and issue commands to memory 830. It will be understood that memory controller 822 could be a physical part of processor 810 or a physical part of interface 812. For example, memory controller 822 can be an integrated memory controller, integrated onto a circuit with processor 810. Memory subsystem 820 also may be employed in a disaggregated architecture where a portion of memory may be accessed over a fabric or network.

While not specifically illustrated, it will be understood that computing platform 800 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, computing platform 800 includes interface 814, which can be coupled to interface 812. In one example, interface 814 represents an interface circuit, which can include standalone components and integrated circuitry. In one example, multiple user interface components or peripheral components, or both, couple to interface 814. Network interface 850 provides computing platform 800 the ability to communicate with remote devices (e.g., servers or other computing devices) over one or more networks. Network interface 850 can include an Ethernet adapter, wireless interconnection components, cellular network interconnection components, USB (universal serial bus), or other wired or wireless standards-based or proprietary interfaces. Network interface 850 can transmit data to a device that is in the same data center or rack or a remote device, which can include sending data stored in memory. Network interface 850 can receive data from a remote device, which can include storing received data into memory. Various embodiments can be used in connection with network interface 850, processor 810, and memory subsystem 820.

In one example, computing platform 800 includes one or more IO interface(s) 860. IO interface 860 can include one or more interface components through which a user interacts with computing platform 800 (e.g., audio, alphanumeric, tactile/touch, or other interfacing). Peripheral interface 870 can include any hardware interface not specifically mentioned above. Peripherals refer generally to devices that connect dependently to computing platform 800. A dependent connection is one where computing platform 800 provides the software platform or hardware platform or both on which operation executes, and with which a user interacts.

In one example, computing platform 800 includes storage subsystem 880 to store data in a nonvolatile manner. In one example, in certain system implementations, at least certain components of storage 880 can overlap with components of memory subsystem 820. Storage subsystem 880 includes storage device(s) 884, which can be or include any conventional medium for storing large amounts of data in a nonvolatile manner, such as one or more magnetic, solid state, or optical based disks, or a combination. Storage 884 holds code or instructions and data 886 in a persistent state (i.e., the value is retained despite interruption of power to computing platform 800). Storage 884 can be generically considered to be a "memory," although memory 830 is typically the executing or operating memory to provide instructions to processor 810. Whereas storage 884 is nonvolatile, memory 830 can include volatile memory (i.e., the value or state of the data is indeterminate if power is interrupted to computing platform 800). In one example, storage subsystem 880 includes controller 882 to interface with storage 884. In one example controller 882 is a physical part of interface 814 or processor 810 or can include circuits or logic in both processor 810 and interface 814.

A volatile memory is memory whose state (and therefore the data stored in it) is indeterminate if power is interrupted to the device. Dynamic volatile memory requires refreshing the data stored in the device to maintain state. One example of dynamic volatile memory includes DRAM, or some variant such as Synchronous DRAM (SDRAM). A memory subsystem as described herein may be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WIO2 (Wide Input/output version 2, JESD229-2 originally published by JEDEC in August 2014), HBM (High Bandwidth Memory, JESD325, originally published by JEDEC in October 2013, LPDDR5 (currently in discussion by JEDEC), HBM2 (HBM version 2), currently in discussion by JEDEC, or others or combinations of memory technologies, and technologies based on derivatives or extensions of such specifications. The JEDEC standards are available at www.jedec.org.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

A power source (not depicted) provides power to the components of computing platform 800. More specifically, power source typically interfaces to one or multiple power supplies in computing platform 800 to provide power to the components of computing platform 800. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, computing platform 800 can be implemented using interconnected compute sleds of processors, memories, storages, network interfaces, and other components. High speed interconnects can be used such as: Ethernet (IEEE 802.3), remote direct memory access (RDMA), InfiniBand, Internet Wide Area RDMA Protocol (iWARP), quick UDP Internet Connections (QUIC), RDMA over Converged Ethernet (RoCE), Peripheral Component Interconnect express (PCIe), Intel® QuickPath Interconnect (QPI), Intel® Ultra Path Interconnect (UPI), Intel® On-Chip System Fabric (IOSF), Omnipath, Compute Express Link (CXL), HyperTransport, high-speed fabric, NVLink, Advanced Microcontroller Bus Architecture (AMBA) interconnect, OpenCAPI, Gen-Z, Cache Coherent Interconnect for Accelerators (CCIX), 3GPP Long Term Evolution (LTE) (4G), 3GPP 5G, and variations thereof. Data can be copied or stored to virtualized storage nodes using a protocol such as NVMe over Fabrics (NVMe-oF) or NVMe.

SASE, Cloud-Host Services and Edge Services

The teachings and principles disclosed herein may be implemented in Secure Access Service Edge (SASE) environments, for cloud-hosted services and for edge service implementations. Generally, a SASE simplifies wide-area networking and security by delivering both as a cloud service directly to the source of connection rather than the enterprise data center. For security reasons, microservices and other cloud-hosted services and edge services may employ HTTPS. As another layer of security, enterprise connections to these services preferably employ VPNs. This leads to the double-encryption problem the solutions disclosed above avoid.

In addition, teachings and principles may be applied to hardware-accelerated implementations. For example, SmartNICs may employ logic for establishing VPN connections independent of host processors (or otherwise assisting host processors). Thus, for SmartNICs, the functionality of the network driver and VPN agents shown in FIGS. 6 and 7 may be implemented in hardware.

The embodiments disclosed above provide several advantageous over conventional VPN approaches. As discussed above, conventional VPN networks tunnel all the traffic to a centralized server with dedicated encryption for all traffic regardless of source characteristics. This oblivious operation results in double encryption of data when they are already encrypted at the application (e.g., HTTPS). From microservices deployments in cloud-native applications to telecom distributed network function, the end-to-end encryptions are provided at the application level, and therefore the network layer security encryption imposes a burden without any value, hence our solution bypasses the encrypted traffic using dedicated VPN paths avoiding re-encryptions. The operations and gains are complementary for decryption.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other. Additionally, "communicatively coupled" means that two or more elements that may or may not be in direct contact with each other, are enabled to communicate with each other. For example, if component A is connected to component B, which in turn is connected to component C, component A may be communicatively coupled to component C using component B as an intermediary component.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As discussed above, various aspects of the embodiments herein may be facilitated by corresponding software components and applications, such as software executed on a processor or the like. Thus, embodiments of this invention may be used as or to support a software program, software modules, firmware, and/or distributed software executed upon some form of processor, processing core or embedded logic a virtual machine running on a processor or core or otherwise implemented or realized upon or within a non-transitory computer-readable or machine-readable storage medium. A non-transitory computer-readable or machine-readable storage medium includes any mechanism for storing or transmitting information in a form readable by a machine (e.g., a computer). For example, a non-transitory computer-readable or machine-readable storage medium includes any mechanism that provides (i.e., stores and/or transmits) information in a form accessible by a computer or computing machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A non-transitory computer-readable or machine-readable storage medium may also include a storage or database from which content can be downloaded. The non-transitory computer-readable or machine-readable storage medium may also include a device or product having content stored thereon at a time of sale or delivery. Thus, delivering a device with stored content, or offering content for download over a communication medium may be understood as providing an article of manufacture comprising a non-transitory computer-readable or machine-readable storage medium with such content described herein.

Various components referred to above as processes, servers, or tools described herein may be a means for performing the functions described. The operations and functions performed by various components described herein may be implemented by software running on a processing element, via embedded hardware or the like, or any combination of hardware and software. Such components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration information, etc.) may be provided via an article of manufacture including non-transitory computer-readable or machine-readable storage medium, which provides content that represents instructions that can be executed. The content may result in a computer performing various functions/operations described herein.

As used herein, a list of items joined by the term "at least one of" can mean any combination of the listed terms. For example, the phrase "at least one of A, B or C" can mean A; B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method for securely transferring data, comprising:
   establishing a virtual private network (VPN) link between a first platform running a first application and a second platform communicatively coupled to the first platform via one or more networks and running a second application;
   establishing an auxiliary link comprising a NULL encryption VPN tunnel between the first platform and the second platform;
   establishing a Transport Layer Security (TLS) VPN session to be used for forwarding traffic over the VPN link;
   establishing an auxiliary TLS session to transfer data over the auxiliary link,
   wherein each of the TLS VPN session and the auxiliary TLS session has a TLS session identifier (ID);
   maintaining a data structure mapping TLS session IDs to cipher information indicating whether a TLS session ID is associated with a TLS VPN cipher or a NULL encryption;
   determining whether data to be transferred between the first application and second application are encrypted data or non-encrypted data; and
   when the data are encrypted, transferring the data between the first platform and the second platform over the auxiliary link; otherwise,
   when the data are non-encrypted, transferring the data between the first platform and the second platform over the VPN link, wherein the non-encrypted data are encrypted using a VPN protocol comprising a TLS protocol in connection with transferring the data over the VPN link.

2. The method of claim 1, wherein the VPN protocol is implemented via VPN agents comprising software running on the first and second platforms.

3. The method of claim 1, wherein the encrypted data comprise Hypertext Transport Protocol Secure (HTTPS) traffic.

4. A computing platform, comprising a first computing platform and including:
   a processor;
   memory, operatively coupled to the processor;
   a network interface, operatively coupled to the processor; and
   software instructions, configured to be executed on the processor to enable the computing platform to:
   establish a virtual private network (VPN) link between the first computing platform and a second computing platform communicatively coupled to the first computing platform via one or more networks;
   establish an auxiliary link comprising a NULL encryption VPN tunnel between the first computing platform and the second computing platform;
   establish a Transport Layer Security (TLS) VPN session to be used for forwarding traffic over the VPN link;
   establish an auxiliary TLS session to transfer data over the auxiliary link,
   wherein each of the TLS VPN session and the auxiliary TLS session has a TLS session identifier (ID);
   maintain a data structure mapping TLS session IDs to cipher information indicating whether a TLS session ID is associated with a TLS VPN cipher or a NULL encryption;
   determine whether data to be transferred between the first computing platform and the second computing platform are encrypted data or non-encrypted data; and
   when the data are encrypted, transferring the data between the first computing platform and the second computing platform over the auxiliary link; otherwise,
   when the data are non-encrypted, encrypting the data using a TLS protocol and transferring the data encrypted using the TLS protocol between the first computing platform and the second computing platform over the VPN link.

5. The computing platform of claim 4, wherein the software instructions include instructions comprising a VPN agent, and wherein the TLS protocol is implemented via the VPN agent.

6. The computing platform of claim 4, wherein the encrypted data comprise Hypertext Transport Protocol Secure (HTTPS) traffic.

7. A non-transitory machine-readable storage medium having instructions stored there thereon configured to executed on a processor of a first computing platform including a first network interface communicatively coupled to a second network interface of a second computing platform, wherein execution of the instructions enables the first computing platform to:
   establish a virtual private network (VPN) link between the first computing platform and a second computing platform communicatively coupled to the first computing platform via one or more networks;
   establish an auxiliary link comprising a NULL encryption VPN tunnel between the first computing platform and the second computing platform;
   establish a Transport Layer Security (TLS) VPN session to be used for forwarding traffic over the VPN link;
   establish an auxiliary TLS session to transfer data over the auxiliary link,
   wherein each of the TLS VPN session and the auxiliary TLS session has a TLS session identifier (ID);
   maintain a data structure mapping TLS session IDs to cipher information indicating whether a TLS session ID is associated with a TLS VPN cipher or a NULL encryption;
   determine whether data to be transferred between the first computing platform and the second computing platform are encrypted data or non-encrypted data; and when the data are encrypted, transferring the data between the first computing platform and the second computing platform over the auxiliary link; otherwise, when the data are non-encrypted, encrypting the data using a TLS protocol and transferring the data encrypted using the TLS protocol between the first computing platform and the second computing platform over the VPN link.

8. The non-transitory machine-readable storage medium of claim 7, wherein the encrypted data comprise Hypertext Transport Protocol Secure (HTTPS) traffic.

9. The non-transitory machine-readable storage medium of claim 7, wherein the software instructions include instructions comprising a VPN agent, and wherein the TLS protocol is implemented via the VPN agent.

\* \* \* \* \*